O. GAMMON.
CRANK SHAFT BEARING.
APPLICATION FILED MAY 15, 1920.
1,362,584.
Patented Dec. 14, 1920.
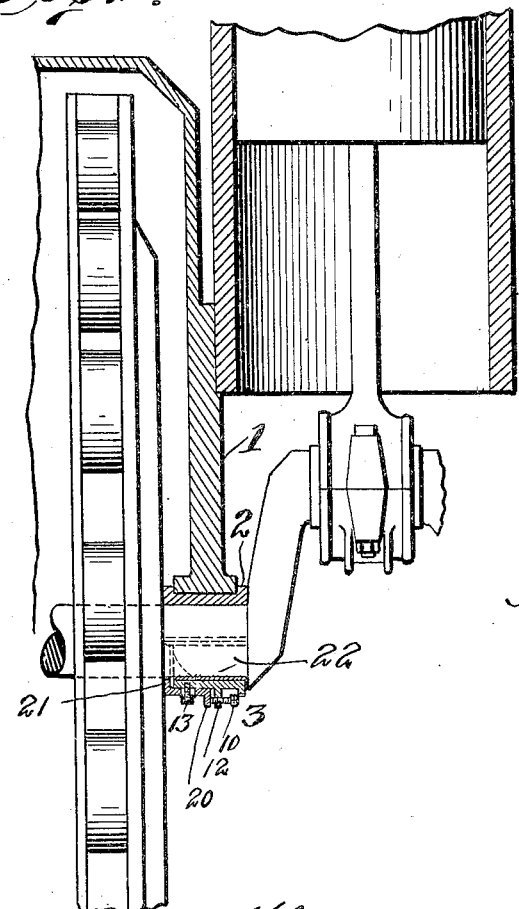
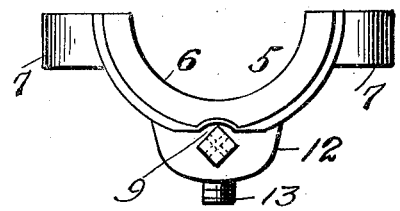
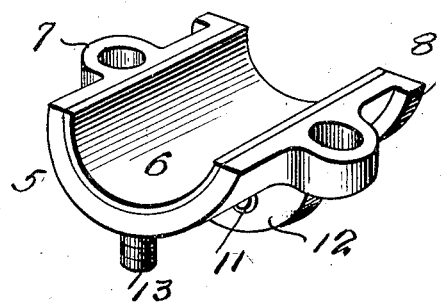
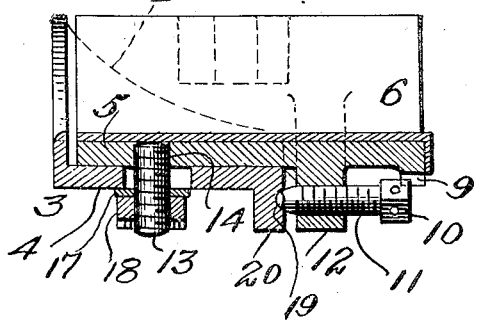
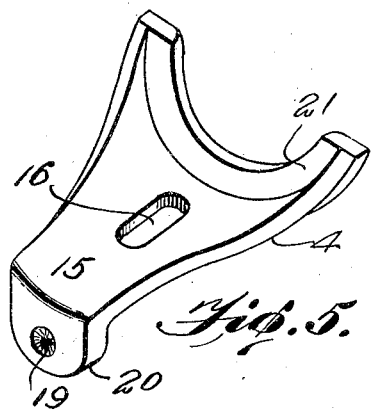
Inventor
Ora Gammon

UNITED STATES PATENT OFFICE.

ORA GAMMON, OF BRUSH, COLORADO.

CRANK-SHAFT BEARING.

1,362,584. Specification of Letters Patent. Patented Dec. 14, 1920.

Application filed May 15, 1920. Serial No. 381,710.

*To all whom it may concern:*

Be it known that I, ORA GAMMON, a citizen of the United States, residing at Brush, in the county of Morgan and State of Colorado, have invented certain new and useful Improvements in Crank-Shaft Bearings, of which the following is a specification, reference being had therein to the accompanying drawings.

This invention relates to a crank shaft bearing, and more particularly to a bearing that is used upon an automobile commonly known as the "Ford" automobile.

The object of my invention is the construction of a novel bearing that will eliminate end play of the crank shaft. My device prevents magnets from bumping coil after inner bearing becomes worn, and my device can be adjusted immediately without removing the engine, whereas, with the old type of bearing on a "Ford" automobile, a very long and tedious operation has to be involved for obtaining any adjustment of the crank shaft.

The improvement disclosed in this application is an improvement over the improvement disclosed in my co-pending application, relating to a "crank shaft Ford bearing," Serial No. 353,726.

With the foregoing object in view, my invention comprises certain novel combinations, constructions and arrangements of parts as will be hereinafter described, illustrated in the accompanying drawings, and more particularly pointed out in the appended claims.

In the drawings:

Figure 1 is a fragmentary sectional view of an engine, showing my bearing device in section.

Fig. 2 is an enlarged longitudinal sectional view of my device.

Fig. 3 is a rear end view of the device.

Fig. 4 is a perspective view of the inner section of the lower bearing section.

Fig. 5 is a perspective view of the outer section of the lower bearing section.

Referring to the drawings by numerals, 1 designates a portion of the casing of the engine, which is provided with an upper bearing section 2, to which is secured a removable lower bearing section 3.

The lower bearing section 3 comprises an outer section 4 and an inner section 5. This inner section 5 is provided with a lining 6; its upper edge is provided with outwardly-extending horizontal, apertured lugs 7, whereby ordinary bolts can secure the lower bearing section 3 upon the upper bearing section 2 in any desired manner, the whole bearing device being supported in any ordinary manner upon the casing 1.

The inner section of the lower bearing section is provided with a flange 8 at one end, in which flange is a cut-out portion 9 for permitting the passage of head 10 of bolt 11. The bolt 11 is threaded through the depending lug 12 formed upon the lower face of the inner section 5, between its ends. Near one end of the inner section 5 is a vertical bolt or threaded member 13, which member 13 is threaded into a socket 14 formed in the outer face of the inner section 5.

The outer section 4 of the lower bearing section 3 comprises a body 15, curved in cross section to conform to the similar structure of the outer face of the inner bearing section 5. The body 15 is provided with a longitudinally-extending aperture 16, through which extends the threaded member 13; the aperture 16 permits the outer section 4 to have a sliding movement on the inner section 5 but, by means of washer 17 and locking nut 18, mounted upon the threaded member 13, the outer section 4 is retained upon the inner section 5. The inner end of bolt 11 works in the socket 19 formed upon the depending lip 20 at the inner end of the body 15. At the outer end of the body 15 is a curved flange 21 that bears snugly against the shaft 22, Fig. 1. By adjusting the outer section 4 of the lower bearing section 3, outwardly end thrust is taken up, the outer section being securely fastened in its adjusted position, by means of bolt 11 and the threaded member 13, together with the locking nut 19.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a device of the class described, the combination with an upper bearing section, of a lower bearing section assembled therewith, said lower bearing section comprising an inner section and an outer section, said inner section provided with an end flange having a socket, a depending lip formed upon the inner bearing section intermediate its ends, a horizontal bolt threaded through said depending lip and having a portion in said socket of the flange, said outer section of the lower bearing section comprising a body provided with a longitudinally-extending elongated aperture, and with a shaft-engaging flange at one end and with a depending socketed lip at its other end, said bolt threaded through the first-mentioned lip having its inner end in the socketed lip of the outer bearing section, a threaded member threaded into the inner section and normally positioned in the elongated aperture of the body of the outer section, and locking means on said threaded member holding said outer section in an assembled position with the inner section, substantially as shown and described.

2. In a device of the class described, the combination with an upper bearing section, of a lower bearing section assembled therewith, said lower bearing section comprising an inner section and an outer section slidably mounted thereon, said outer section provided with a flange at one end for engaging a shaft and its other end with a depending lip, means carried by the inner section and extending through the outer section and retaining the outer section against the inner section, and means carried by the inner section and engaging the depending lip of the outer section for adjusting the outer section longitudinally of the inner section.

3. In a device of the class described, the combination with an upper bearing section, of a lower bearing section carried by said upper bearing section, said lower bearing section comprising an inner and an outer section, a threaded member threaded at one end into said inner bearing section and having its other end extending through and beyond the outer section, a locking nut upon the extended end of the threaded member retaining said outer section in an assembled position with the inner section, and manually-operated means carried by the inner section and normally engaging the outer section for moving the outer section longitudinally upon the inner section and slidably supported upon the threaded member.

In testimony whereof I hereunto affix my signature.

ORA GAMMON.